UNITED STATES PATENT OFFICE.

JAMES H. NORTHROP, OF INDIO, CALIFORNIA.

DATE-FOOD PRODUCT AND METHOD OF MAKING THE SAME.

1,307,691.      Specification of Letters Patent.      Patented June 24, 1919.

No Drawing.      Application filed October 24, 1918. Serial No. 259,533.

*To all whom it may concern:*

Be it known that I, JAMES H. NORTHROP, a citizen of the United States, residing at Indio, in the county of Riverside and State of California, have invented a new and useful Date-Food Product and Method of Making the Same, of which the following is a specification.

In the production of dates in the Coachella Valley, California, and elsewhere there are found to be different grades of fruit, some of which is choice in appearance and is picked for fancy trade in the market while other of such fruit is less pleasing in appearance and in some instances is discarded as not marketable.

An object of this invention and discovery is to produce from this hitherto unattractive fruit a food product which utilizes all of the pulp of such unattractive fruit and makes the same marketable; and in the course of my efforts and experiments to produce such a result I have discovered a food product, which, while it contains the food elements of the date, is of a character different from any food product heretofore known, having pleasing qualities peculiar to itself and producing from the heretofore sometime waste and discarded fruit, a product that is as readily marketable as the best grades of the fruit as heretofore graded, and is attractive and palatable.

I have discovered that by passing the pulp or meat of dates between two surfaces and collecting the product into a mass, a conglomerate is produced that is characterized by a flavor different from that of the whole dates from which it is made and said conglomerate consists of unground shreds of the firmer constituents of the date meats and gummy constituents of the dates pressed onto said shreds.

I have discovered that by rolling the pulp or meats of dates through a narrow slot so that the rag of the date will be only shredded and will not be ground or finely divided, and the paste of the date is pressed onto the shreds, a conglomerate lumpy mass that is superior for food purposes is produced.

I have produced this new product by causing the ripe dates to be acted upon by the mutually approaching surfaces of two rapidly revolving rollers; said dates being introduced to the receptacle formed by the furrow between the rollers and sufficiently forced toward the rollers to cause the roller faces to take hold of and break the pulps of the dates, there being a sufficient space between the rollers to allow the pulp but not the seeds of the dates to pass through.

By this means the split and broken pulps consisting of what is known as the rag, together with the paste of the date, are brought together in a lumpy conglomerate form in which the paste is spread over and through masses of the firmer and more rigid portions of the pulp.

I also have discovered that by selecting the dates with regard to their character and consistency, taking what are called dry dates, together with other dates containing a larger percentage of paste or gum than such dry dates, a conglomerate confection or food can be made that is more pleasing to the common palate than either kind of dates not combined in the manner stated.

It is important that the date meats shall not be ground, because the grinding process breaks up the structure of the dates in such a manner as to cause the product to be a homogeneous mass that cannot be readily broken or pulled into bits or lumps for eating, and the palate becomes clogged or satiated much more quickly than with the product I have produced.

I claim,

1. The new food product set forth consisting of a conglomerate which is formed of the shredded and non-ground pulp of dates.

2. The new food product set forth comprising non-ground shredded meats of dates in a conglomerate form in which the rag is shredded and the gum or paste is compressed onto said rag.

3. The new food product set forth comprising the split and broken meat of dates appearing as a lumpy conglomerate in which the rag of the date is in shreds and said shreds are held together by the paste of the fruit.

4. The method set forth of making a food product which consists in breaking the pulps of dates into shreds, and coating the shreds with date paste, and thereby producing a conglomerate mass.

5. The method set forth of making a food product which consists in breaking the pulps of dry dates into shreds, and coating the shreds with date paste, thereby producing a lumpy conglomerate mass.

6. The new food product set forth which consists of a lumpy conglomerate composed of the pulps of dates broken into shreds and coated with date paste.

7. The new food product set forth which consists of a lumpy conglomerate comprising the pulps of dry dates broken into shreds and coated with date paste.

8. The new food product set forth which consists of dry dates and other dates shredded together and formed into a conglomerate mass.

In testimony whereof, I have hereunto set my hand at Los Angeles, California, this 5th day of October, 1918.

JAMES H. NORTHROP.

Witness:
 JAMES R. TOWNSEND.